(12) United States Patent
Davis

(10) Patent No.: US 9,150,994 B2
(45) Date of Patent: Oct. 6, 2015

(54) BALANCE RING WITH FEATURES TO CONTROL FLUID DISTRIBUTION

(75) Inventor: Paul Owen Davis, Louisville, KY (US)

(73) Assignee: General Electric Company, Schenectady, NY (US)

(*) Notice: Subject to any disclaimer, the term of this patent is extended or adjusted under 35 U.S.C. 154(b) by 748 days.

(21) Appl. No.: 13/477,226

(22) Filed: May 22, 2012

(65) Prior Publication Data

US 2013/0312464 A1 Nov. 28, 2013

(51) Int. Cl.
*F16F 15/36* (2006.01)
*D06F 37/24* (2006.01)
*D06F 37/22* (2006.01)

(52) U.S. Cl.
CPC ............ *D06F 37/225* (2013.01); *D06F 37/245* (2013.01); *F16F 15/366* (2013.01); *Y10T 74/2122* (2015.01)

(58) Field of Classification Search
CPC ..... D06F 37/245; D06F 37/225; D06F 37/04; D06F 37/12; D06F 37/24; Y10T 74/2109; Y10T 74/2111
USPC ....... 68/23.2, 23 R, 19, 212, 23.1, 23.3, 23.5; 74/572.4, 570.2, 571.1, 570.3; 137/44; 8/159
See application file for complete search history.

(56) References Cited

U.S. PATENT DOCUMENTS

| | | | | |
|---|---|---|---|---|
| 1,521,858 | A | * | 1/1925 | Bock ........................... 74/572.4 |
| 2,652,710 | A | | 9/1953 | Remer |
| 5,855,127 | A | * | 1/1999 | Kohara et al. .................. 68/23.2 |
| 6,550,292 | B1 | * | 4/2003 | Southworth et al. ........... 68/23.2 |
| 6,658,902 | B2 | | 12/2003 | Southworth et al. |
| 2004/0172987 | A1 | * | 9/2004 | Lim et al. ....................... 68/23.1 |

* cited by examiner

*Primary Examiner* — Michael Barr
*Assistant Examiner* — Tinsae Ayalew
(74) *Attorney, Agent, or Firm* — Dority & Manning, P.A.

(57) ABSTRACT

A balance ring for an appliance is provided that has features to control fluid distribution particularly during certain critical speeds where large oscillatory motion created by an out of balance condition might otherwise cause the balance ring fluid to redistribute improperly. The balance ring can include an inner chamber that is in fluid communication with an outer chamber. The inner chamber can include baffles that impede the movement of fluid along the circumferential direction when e.g., the balance ring experiences large oscillatory motion.

18 Claims, 7 Drawing Sheets

BALANCE RING WITH FEATURES TO CONTROL FLUID DISTRIBUTION

FIELD OF THE INVENTION

The subject matter of the present disclosure relates generally to a balance ring for an appliance.

BACKGROUND OF THE INVENTION

During the operation of a washing machine, particularly during spin cycles, the machine can sometimes experience an extreme vibration. These vibrations can even cause displacement of the washing machine as it "walks" across a surface such as a floor. Typically, this event is due to the different shapes and densities of the clothing or other articles that are being washed which, after the washing cycle and draining the wash basket, can stick together and cause differences in the center of mass inside the wash basket. The vibration problem can also be caused by the introduction of relatively heavier articles into the wash basket such as e.g., shoes.

By way of example, after the washing cycle and draining of the washing liquid from the wash basket, the shoes or other, relatively heavier articles may be located on one side of the wash basket or in a manner that causes the center of mass of the combined wash basket and articles (such as the shoes, clothes, and other items being washed) to be off center. As the wash basket is rotated, particularly at high speeds, the off centering and centrifugal forces creates an imbalance that can generate undesired strain in the washing machine components, an undesirable level of noise, and/or "walking" of the appliance. In an extreme or prolonged situation, the imbalance created by the excessive vibration can also wear-out and damage the washing machine components.

As a result, in order to counter the out of balance wash load, various devices have been proposed. For example, washing machines have been equipped with balance rings, which are typically hollow rings placed on the top and sometimes bottom of the wash basket. Inside the ring (or toroid) a weight such as a fluid and/or movable metal objects such as e.g., solid balls have been inserted. During operation, the ring will act as a counterweight to the out of balance load of clothes because the fluid and/or solid balls will move to a position within the ring that counters the centrifugal forces created by the articles in the wash basket so as to balance the overall mass of the articles in the wash basket.

Thus, for balance rings that incorporate a fluid, during spinning of the wash basket the fluid must be able to redistribute so to act as a counterweight to an out of balance of mass of the articles in the wash basket. Sometimes, however, as the rotational speed of the wash basket increases during a spin cycle, one or more critical speeds (i.e. resonant modes) are reached. At these critical speeds, the translational motion of the balance ring can be severe enough distribute the fluid in a manner that prevents it from properly counteracting the out of balance wash load. In fact, the fluid may even be distributed in a manner that reinforces the tub motion.

BRIEF DESCRIPTION OF THE INVENTION

Aspects and advantages of the invention will be set forth in part in the following description, or may be apparent from the description, or may be learned through practice of the invention.

The present invention provides a balance ring for an appliance with features to control fluid distribution particularly during certain critical speeds where motion created by an out of balance condition might otherwise cause the balance ring fluid to redistribute improperly. The balance ring can include an inner chamber that is in fluid communication with an outer chamber. The inner chamber can include baffles that impede the movement of fluid along the circumferential direction when e.g., the balance ring experiences translational motion.

For example, in one exemplary embodiment, the present invention provides a balance ring for an appliance. The balance ring defines radial and circumferential directions. The balance ring includes an outer chamber extending along the circumferential direction and an inner chamber also extending along the circumferential direction and positioned adjacent and radially inward of the outer chamber. A dividing wall is positioned between the outer chamber and the inner chamber. A plurality of openings are defined by the dividing wall and are spaced apart along the circumferential direction. The openings provide for fluid communication between the outer chamber and the inner chamber. A fluid is located in the outer chamber and the inner chamber.

In another exemplary embodiment, the present invention provides a washing machine appliance that includes a cabinet, a wash tub received within the cabinet; and a wash basket rotatably received within the wash tub. The wash basket has an exterior surface extending circumferentially around the wash basket. A motor is connected with the wash basket and configured for rotating the wash basket. A balance ring is connected to the wash basket and has radial and circumferential directions. The balance ring includes an outer chamber extending along the circumferential direction and an inner chamber extending along the circumferential direction and positioned adjacent and radially inward of the outer chamber. A dividing wall is positioned between the outer chamber and the inner chamber. A plurality of openings are defined by the dividing wall and are spaced apart along the circumferential direction. The openings provide for fluid communication between the outer chamber and the inner chamber. A fluid is located in the outer chamber and the inner chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures indicates the same or similar features.

DETAILED DESCRIPTION OF THE INVENTION

Figure 1:
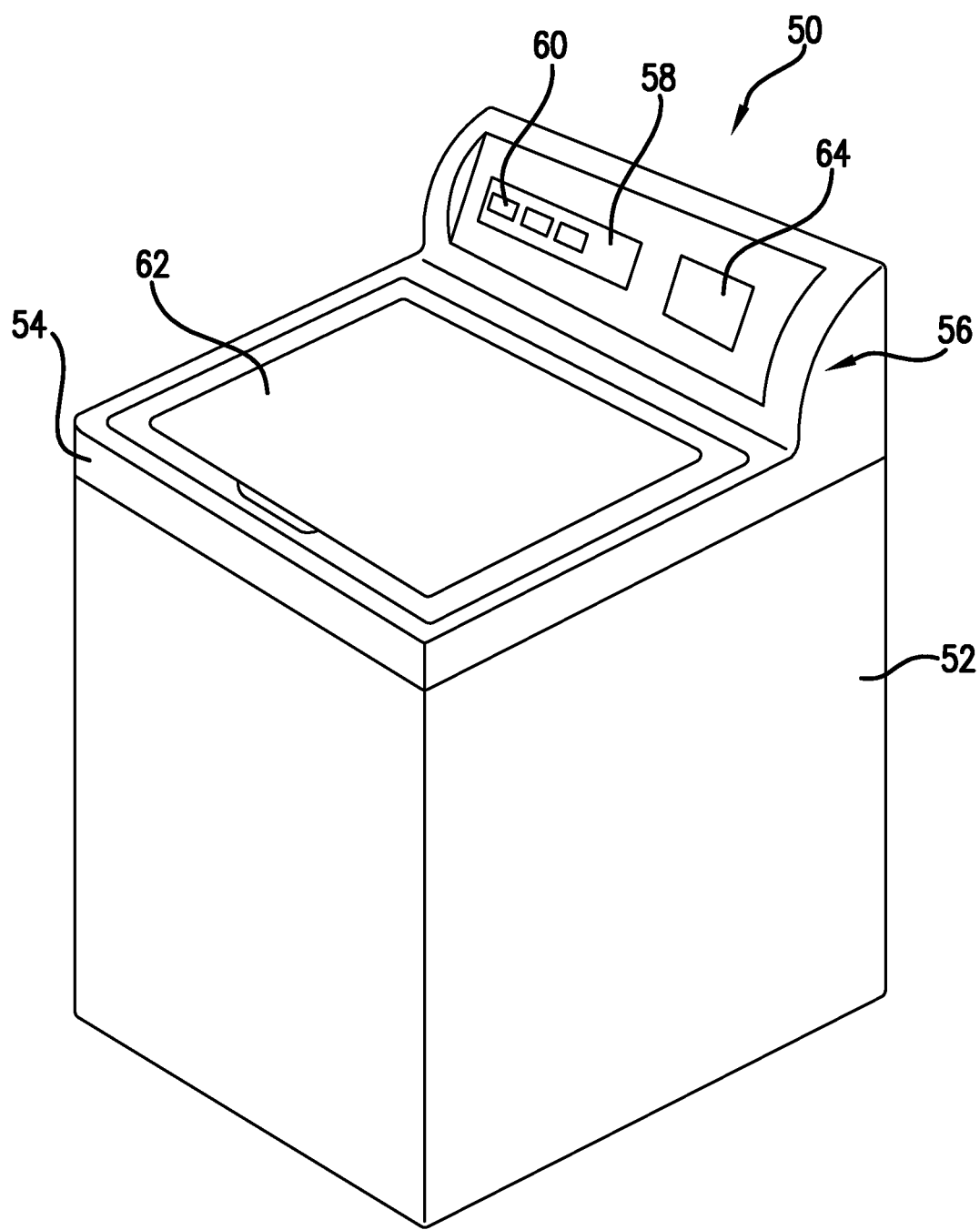
FIG. 1 provides a perspective view of an exemplary embodiment of a washing machine of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
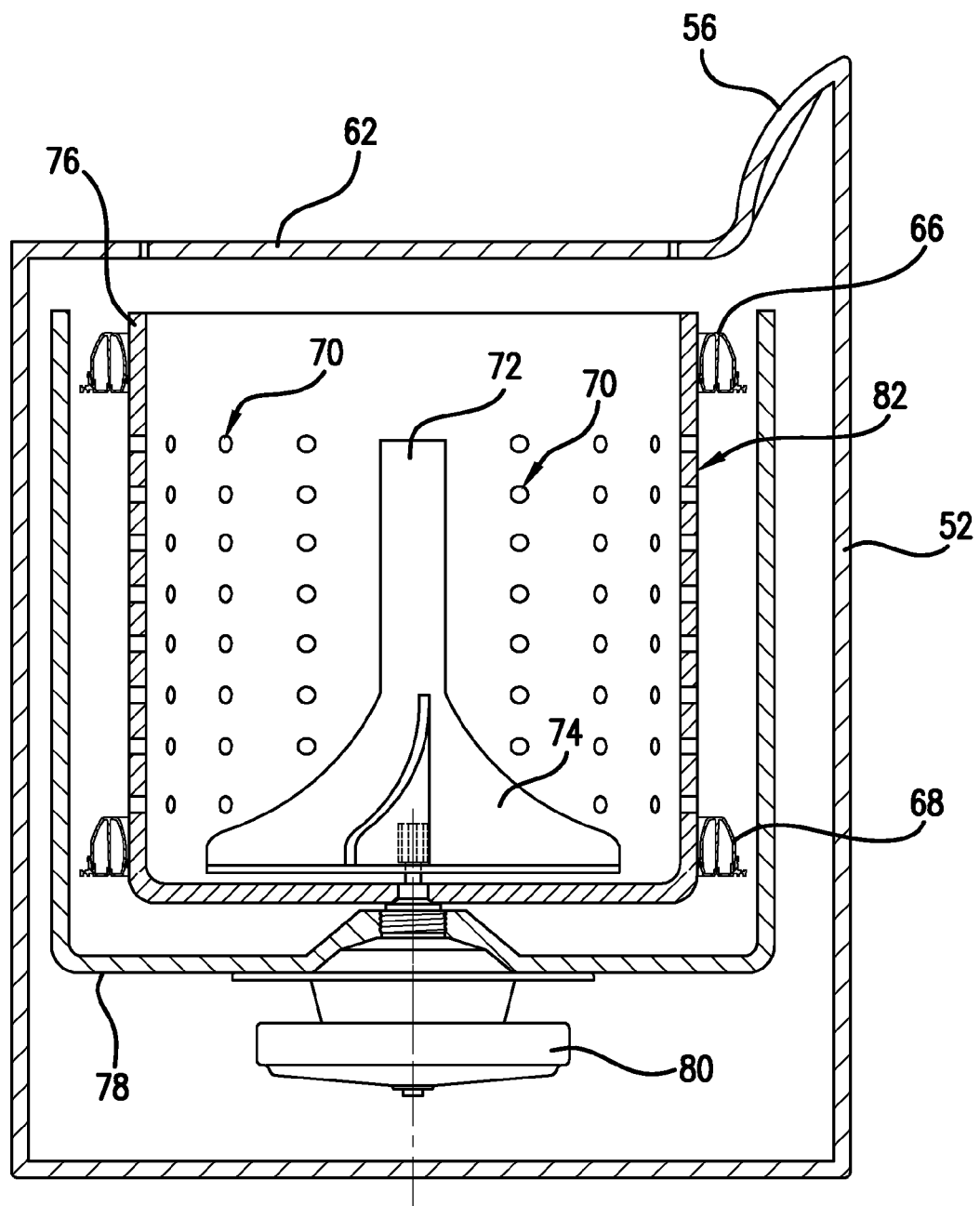
FIG. 2 illustrates a cross-sectional view of the exemplary embodiment of FIG. 1.

FIG. 1 is a perspective view an exemplary vertical axis washing machine 50 including a cabinet 52 and a top cover 54. FIG. 2 provides a cross-sectional, side view of the exemplary embodiment of FIG. 1. A backsplash 56 extends from cover 54. A control panel 58 including a plurality of input selectors 60 is coupled to backsplash 56. Control panel 58 and input selectors 60 collectively form a user interface input for operator selection of machine cycles and features, and in one embodiment, a display 64 indicates selected features, a countdown timer, and/or other items of interest to machine users. A lid 62 is mounted to cover 54 and is rotatable about a hinge (not shown) between an open position (not shown) facilitating access to a wash tub 78 located within cabinet 52, and a closed position (shown in FIG. 1) forming an enclosure over wash tub 78.

A wash basket 76 is located within wash tub 78 in spaced apart relationship from tub 78. Articles for washing are placed within basket 76. A motor 80 is used to selectively spin wash basket 76 during various cycles of the appliance. Wash basket 76 includes a plurality of openings 70 that facilitate the movement of fluid in and out of basket 76 within wash tub 78. When wash basket 76 is rotated at high speed during e.g., a spin cycle, openings 70 in wash basket 76 allow fluid to be wrung from the articles such as clothing located in basket 76.

An agitation element such as agitator 72 with blades 74, impeller, auger, or oscillatory basket mechanism, or some combination thereof is disposed in basket 76 to impart an oscillatory motion to articles and liquid in basket 76 using motor 80. In different embodiments, agitation element 72 can include a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 72 is oriented to rotate about a vertical axis A.

Operation of machine 50 is controlled by a controller or processing device (not shown), that is operatively coupled to the user interface input or control panel 58 located on washing machine backsplash 56 (shown in FIG. 1), which allows e.g., for user manipulation to select washing machine cycles and features. More particularly, in response to user manipulation of the user interface input, the controller operates the various components of machine 50 to execute selected machine cycles and features.

For example, in an illustrative embodiment, laundry items are loaded into basket 76, and washing operation is initiated through operator manipulation of control input selectors 60 (shown in FIG. 1). Wash tub 78 is filled with water and mixed with detergent to form a wash fluid, and contents of the basket 76 are agitated with agitation element 72 for cleansing of laundry items in basket 76. More specifically, agitation element 72 is moved back and forth in an oscillatory back and forth motion.

After the agitation phase of the wash cycle is completed, wash tub 78 can be drained with a pump assembly (not shown). Laundry items are then rinsed and portions of the cycle repeated, including the agitation phase, depending on the particulars of the wash cycle selected by a user. One or more spin cycles may also be used. In particular, a spin cycle may be applied after the wash cycle and/or after the rinse cycle in order to wring wash fluid from the articles being washed. During a spin cycle, wash basket 76 is rotated at relatively high speeds.

While described in the context of a specific embodiment of vertical axis washing machine appliance 50, using the teachings disclosed herein it will be understood that vertical axis washing machine appliance 50 is provided by way of example only. Other washing machine appliances having different configurations, different appearances, and/or different features may also be utilized with the present subject matter as well.

As previously described, the articles inside basket 76 can sometimes cause an imbalance leading to undesirable vibrations of machine 50 during operation. Accordingly, for this exemplary embodiment, washing machine 50 is equipped with exemplary balance rings 66 and 68 that operate to counteract imbalances in the wash load placed into wash basket 76. Balance rings 66 and 68 are shown in cross section in FIG. 2 but should be understood to extend circumferentially about wash basket 76. For this exemplary embodiment, balance rings 66 and 68 are mounted to an exterior surface 82 of wash basket 76 and other techniques for positioning on basket 76 may also be used. Also, although shown with a balance ring positioned at both a top and bottom of wash basket 76, it should be understood that only one such balance ring—particularly at the top of wash basket 76 as with balance ring 66—may be used in other exemplary embodiments of the present invention. Balance rings 66 and 68 include features for controlling the movement of a fluid in such rings that offsets an imbalance of articles in wash basket 76.

Figure 3:
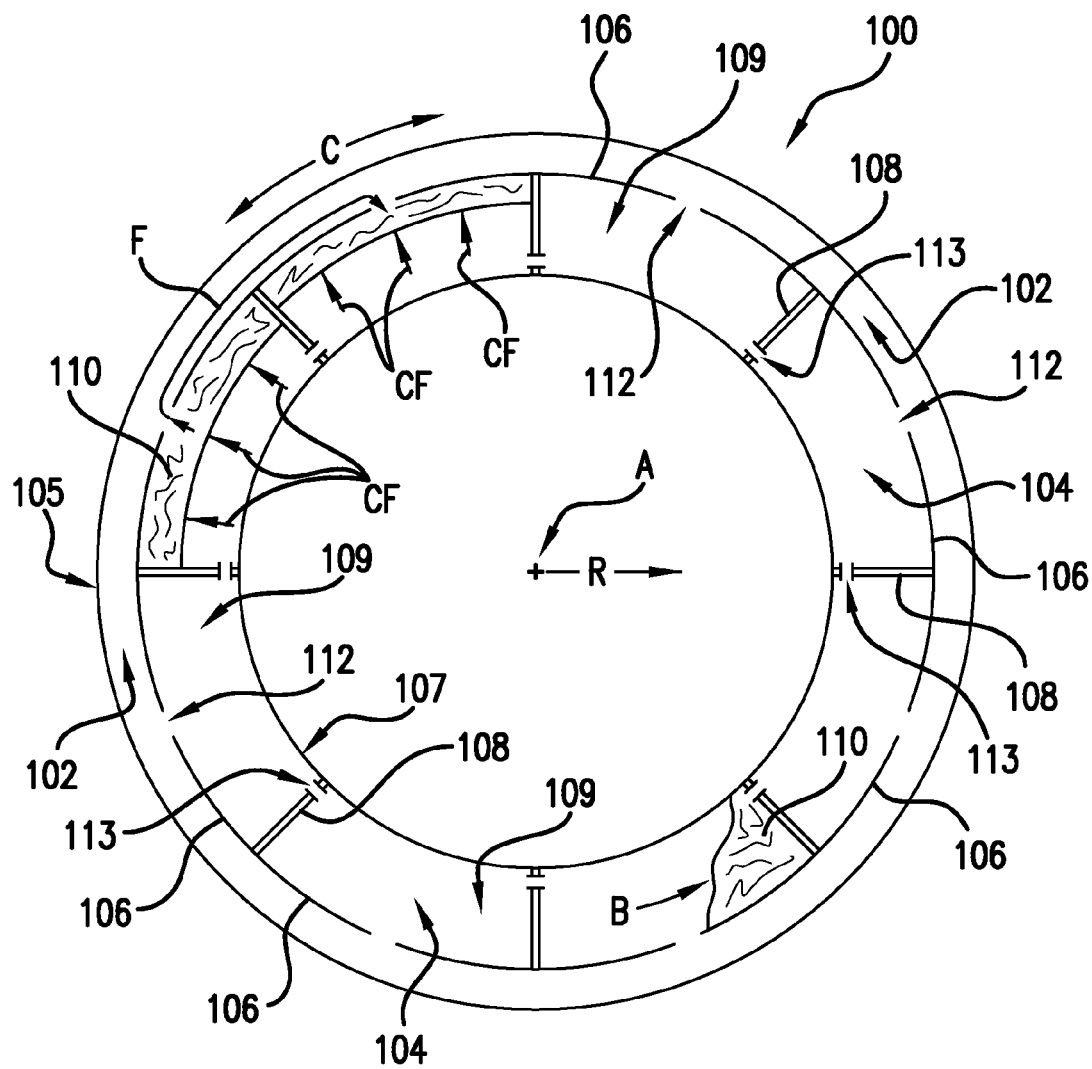
FIG. 3 is cross-sectional, schematic view of an exemplary embodiment of a balance ring of the present invention as viewed from the top down.

For example, FIG. 3 provides a cross-sectional, schematic view of an exemplary embodiment of a balance ring 100 of the present invention as viewed from the top down. Balance ring 100 defines a radial direction as shown by arrow R and circumferential direction C. During operation of the washing machine 50 where wash basket 76 is in spin mode, balance ring 100 rotates about the axis of rotation A. along circumferential direction C.

Balance ring 100 includes an outer chamber 102 that extends uninterrupted along circumferential direction C and contains a fluid such as e.g., a solution of calcium chloride and water. An inner chamber 104 also extends along circumferential direction C is positioned adjacent and radially inward of outer chamber 102. Inner chamber 104, however, is interrupted by a plurality of baffles 108 that are intermittently spaced from each other along the circumferential direction C. Baffles 108 divide inner chamber 104 into multiple sections 109 that are fully separated from each other along the circumferential direction except for openings 113. A dividing wall 106 is positioned between the inner chamber and the outer chamber and separates the two along the circumferential direction. Openings 113 allow fluid to pass only a low speeds. Openings 113 also allow air to pass between chambers 104. In other exemplary embodiments of the invention, baffles 108 may be provided without openings 113.

As further illustrated in FIG. 3, a plurality of apertures or openings 112 are defined by dividing wall 106. Apertures 112 are spaced apart along the circumferential direction and, for exemplary embodiment, are positioned equidistant from a pair of baffles 108 with one aperture 112 located in each section 109. However, as will be understood using the teachings disclosed herein, a different number and positioning for apertures 112 may be used in each section 109. For the exemplary embodiment shown in FIG. 3, a total of 8 sections 109 are shown. However, a different number of sections 109 may be used. For example, 8 to 12 sections may be used in balance ring 100.

During operation, the spinning of balance ring 100 about axis A causes centrifugal forces to act on fluid 110 in the direction indicated by arrows CF. As a result, fluid 110 may pass from inner chamber 104 to outer chamber 102 by passing through apertures or openings 112. Fluid 110 can also move in the circumferential direction C along outer chamber 103 and redistribute between sections 109 of inner chamber 104 as shown by arrow F in order to counter an imbalance in a load of articles placed in the wash tub 78. However, baffles 108 prevent the redistribution of fluid along the circumferential direction C by moving between sections 109 of inner chamber 104. As a result, the movement of fluid along circumferential direction C and between sections 109 must occur through outer chamber 102.

By determining the size of outer chamber 102 relative to inner chamber 104 and the size openings 112, the ability of the fluid 110 to move between sections 109 can be carefully controlled. More specifically, when oscillatory motion (e.g., along radial direction R) occurs as the spinning of balance ring 100 reaches certain critical speeds, the ability of fluid 110 to redistribute between sections 109 is hampered or delayed. As such, fluid 110 cannot redistribute in a manner that reinforces the oscillatory forces so as to further exacerbate an out of balance condition. However, fluid 110 can still redistribute as shown by arrow F so as to gradually offset in imbalance condition.

Figure 4:
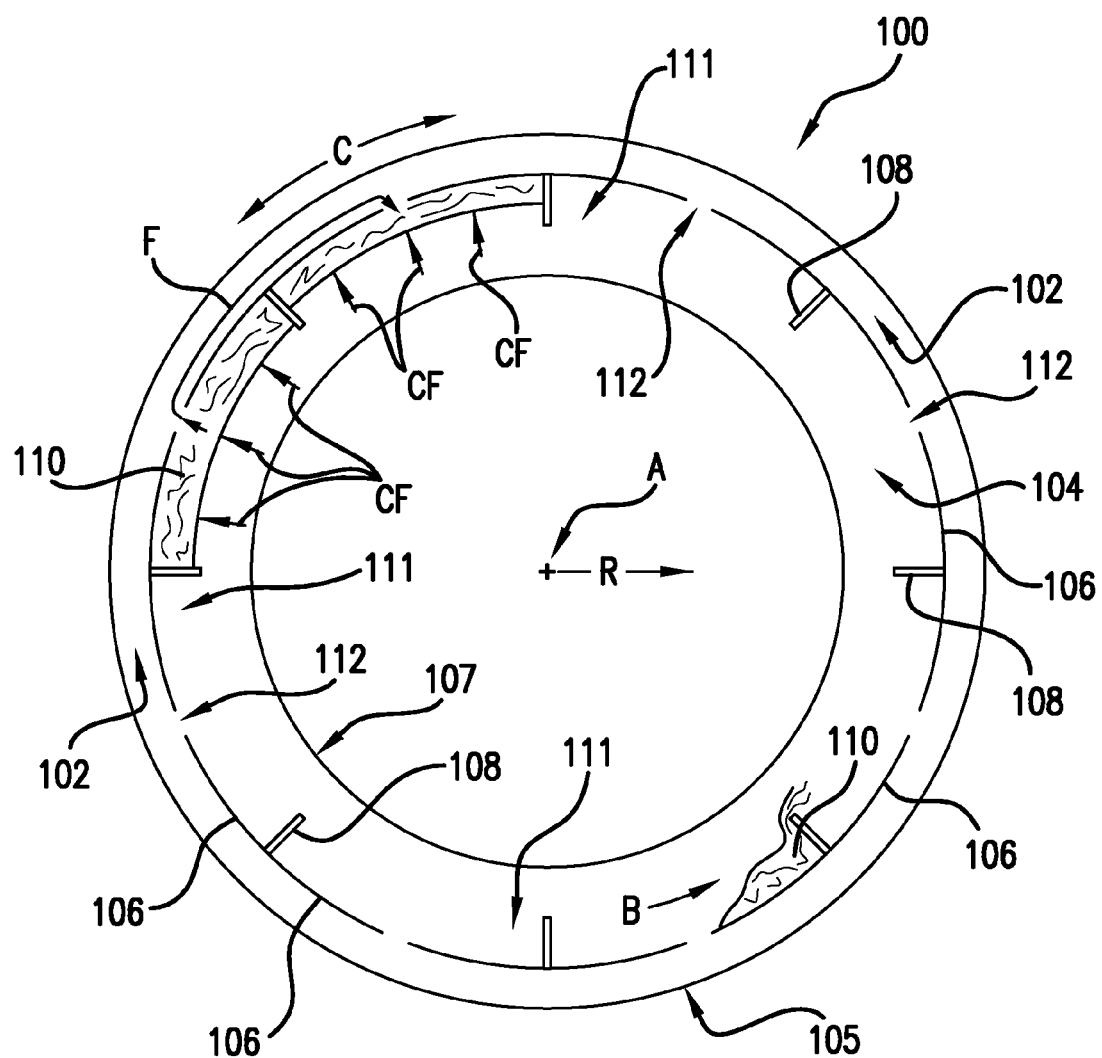
FIG. 4 is another cross-sectional, schematic view of another exemplary embodiment of a balance ring of the present invention as viewed from the top down.

FIG. 4 provides a cross-sectional, schematic view of another exemplary embodiment of balance ring 100 of the present invention as viewed from the top down. The embodiment of FIG. 4 is similar to FIG. 3 except for differences in the width of baffles 108 along radial direction R. As shown baffles 108 extend only partially between dividing wall 106 and inner wall 107 so that inner chamber 104 is divided into partial sections 111. As such, during spinning of balance ring 100, fluid 110 can redistribute between partial sections 111 in a manner as previously described with regard to the embodiment of FIG. 3. However, fluid 110 can also redistribute by spilling over a baffle 108 as shown in the lower part of FIG. 4. Thus, for the exemplary embodiment of a balance ring 100 shown in FIG. 4, the movement of fluid 110 during translational motion at critical rotation speeds is still impeded so as to prevent undesirable reinforcement of the out of balance condition—yet a flow of fluid between partial sections 111 is still allowed so as to provide for a redistribution of fluid 110 that can counter an out of balance condition.

Figure 5:
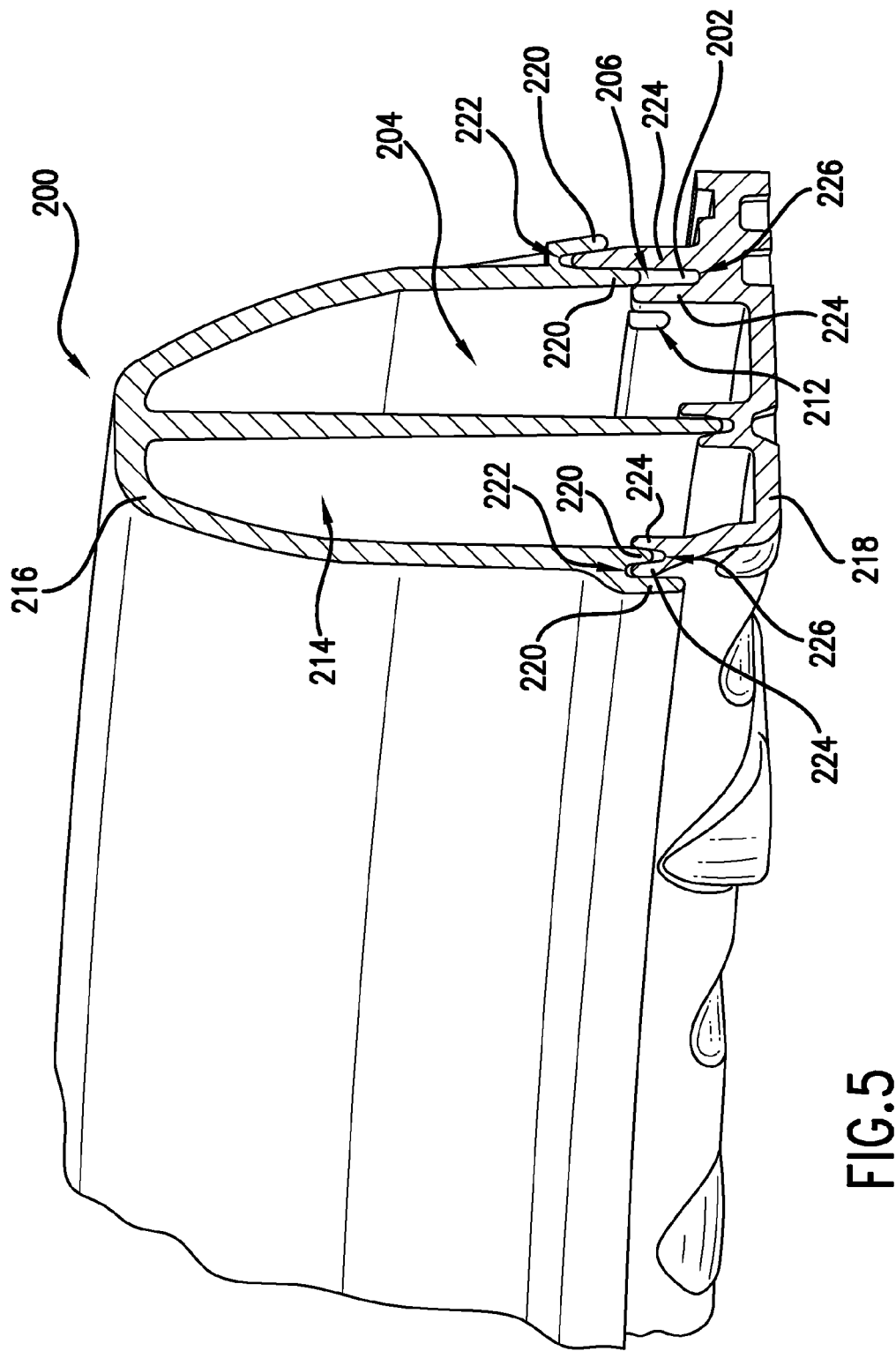
FIG. 5 is a perspective view of an exemplary embodiment of a balance ring with a cross-section provided to illustrate certain internal features.
Figure 6:
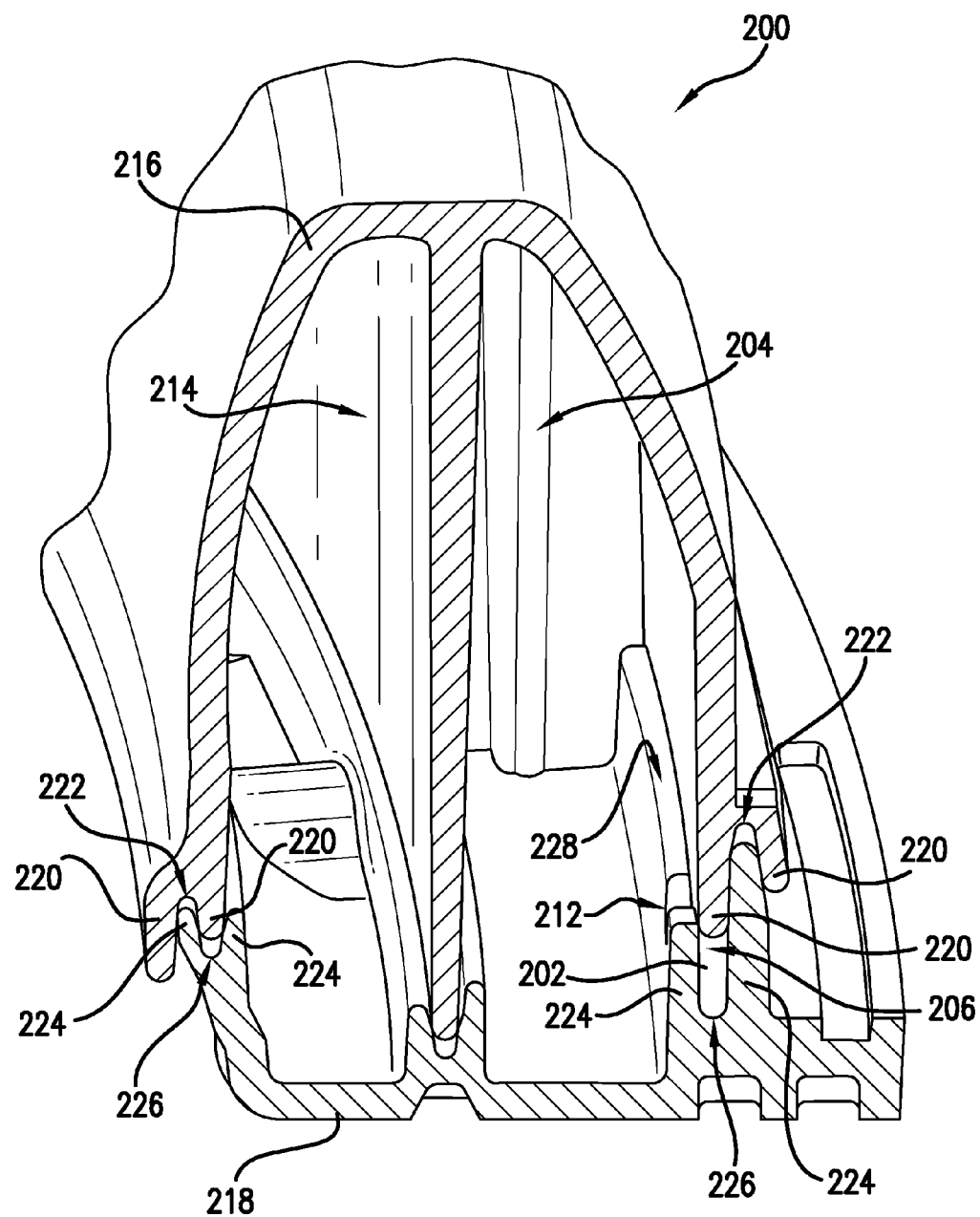
FIG. 6 is another perspective view of the exemplary embodiment of FIG. 5 ring with a cross-section provided to illustrate certain internal features.
Figure 7:
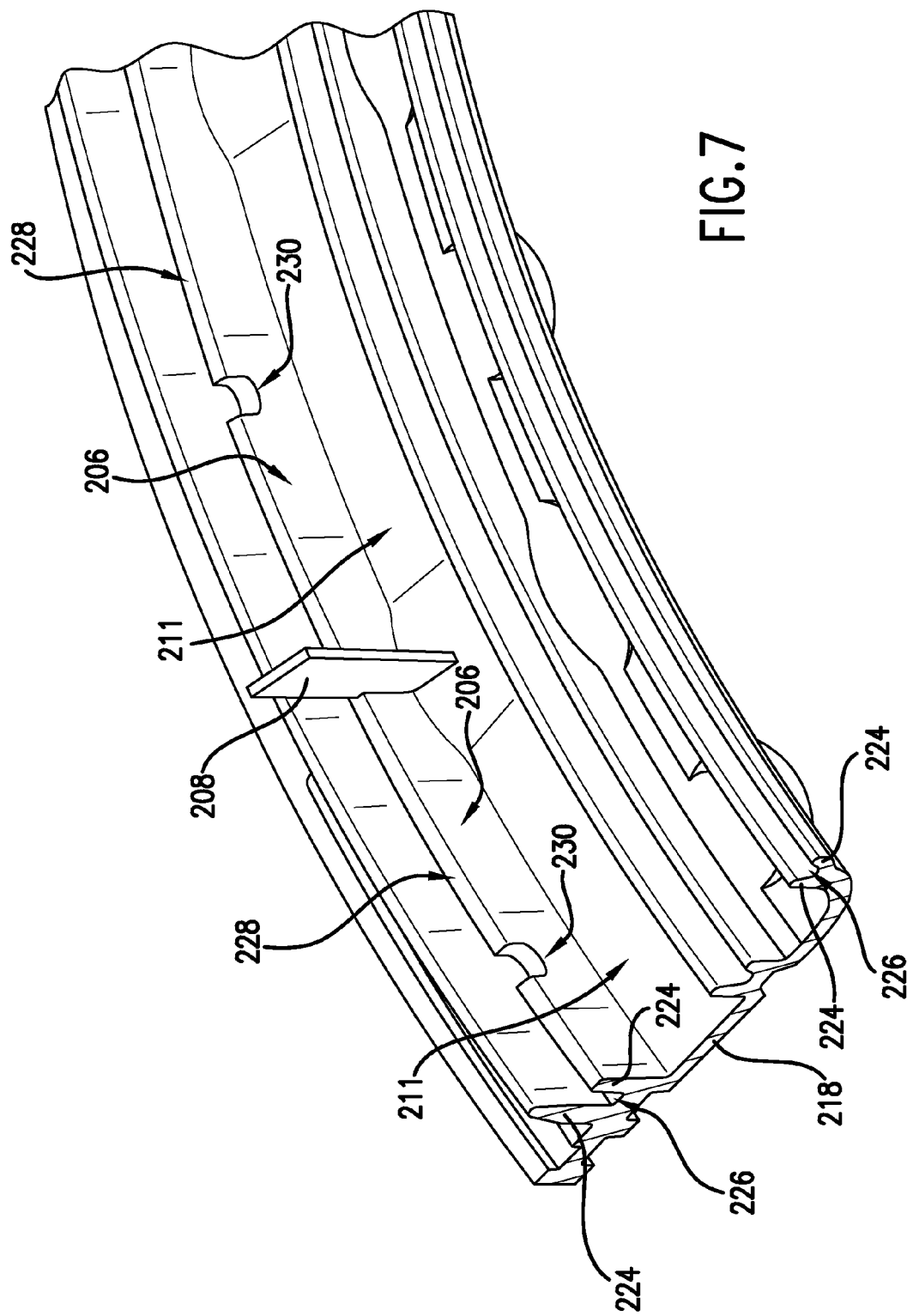
FIG. 7 is a perspective view of a bottom portion of the exemplary embodiment of FIG. 5.

Another exemplary embodiment of a balance ring 200 of the present invention is illustrated using FIGS. 5 through 7. FIGS. 5 and 6 provide different perspective views with a cross-section to illustrate certain internal features while FIG. 7 provides a perspective view of a part of a lower portion 218 of balance ring 200.

For this exemplary embodiment, balance ring 200 is constructed from lower portion 218 and upper portion 216 that are joined together. Upper portion 216 includes a plurality of tongues 220 separated by a groove 222. Similarly, lower portion 218 include a plurality of tongues 224 separated by a groove 226. Together, such features combine in a complementary manner as shown in FIGS. 6 and 7 to secure upper and lower portions 216 and 218 together. Tongues 220 and 224 create a dividing wall 206 along one side of balance ring 200 so as to separate inner chamber 204 and outer chamber 202. An opening 212 allowing fluid to pass between inner chamber 204 and outer chamber 202 is created in part by a groove 230 formed in the top edge 228 of a tongue 224. A baffle 208 divides inner chamber 204 into partial sections 211. Outer chamber 202, inner chamber 204, baffle 208, and openings 212 function in a manner similar to that previously described with regard to the exemplary embodiment of FIG. 4.

For the exemplary embodiment of FIGS. 5 through 7, balance ring 200 is also provided with a radially innermost chamber 214. Radially innermost chamber 214 is completely sealed from inner chamber 104 and outer chamber 102. By way of example, radially innermost chamber 214 could be provided with a fluid to provide additional weight to counter an imbalanced load of articles in the wash basket.

The present invention is not limited to the particular construction of balance ring 200. Using the teachings disclosed herein, it will be understood the other configurations of a balance ring may be applied and such balance ring may be used on washing machines as well as other appliances for which a counter for an out of balance condition of a rotating component is desired. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A balance ring for an appliance, the balance ring defining radial and circumferential directions, the balance ring comprising:
   an outer chamber extending along the circumferential direction;
   an inner chamber, further comprising a plurality of partial inner sections, extending along the circumferential direction and positioned adjacent and radially inward of said outer chamber;
   an innermost chamber extending along the circumferential direction and positioned adjacent and radially inward of said inner chamber;
   a dividing wall positioned between said outer chamber and said inner chamber;
   a plurality of openings defined by said dividing wall and spaced apart along the circumferential direction, said openings providing for fluid communication between said outer chamber and said inner chamber; and
   a fluid located in said outer chamber and said inner chamber, and
   wherein said balance ring is configured to pass said fluid circumferentially between said plurality of partial inner sections only through said outer chamber via said openings at spin cycle rotational speeds.

2. A balance ring for an appliance as in claim 1, further comprising a plurality of baffles positioned in said inner chamber and spaced apart along the circumferential direction, said baffles configured for impeding the flow of said fluid along the circumferential direction.

3. A. balance ring for an appliance as in claim 2, wherein said baffles are arranged in the radial direction.

4. A balance ring for an appliance as in claim 3, wherein said baffles divide the inner chamber into said plurality of partial inner sections that are in fluid communication with each other along the circumferential direction only at low rotational speeds.

5. A balance ring for an appliance as in claim 4, wherein said plurality of openings are positioned so that at least one opening is located at each section of the plurality of partial inner sections.

6. A balance ring for an appliance as in claim 5, wherein each opening of said plurality of openings is positioned symmetrically or unsymmetrically between a respective pair of said plurality of baffles.

7. A balance ring for an appliance as in claim 3, wherein said baffles fully divide the inner chamber into said plurality of partial inner sections that are in fluid communication with each other only at low rotational speeds.

8. A balance ring for an appliance as in claim 7, wherein said plurality of openings are positioned so that at least one opening is located at each section of the plurality of partial inner sections.

9. A balance ring for an appliance as in claim 8, wherein each opening of said plurality of openings is positioned symmetrically or unsymmetrically between a respective pair of said baffles.

10. A balance ring for an appliance as in claim 1, wherein said fluid comprises an aqueous solution of calcium chloride.

11. A balance ring for an appliance as in claim 1, wherein said outer chamber extends completely around said balance ring along the circumferential direction.

12. A balance ring for an appliance as in claim 11, wherein said inner chamber extends completely around the balance ring along the circumferential direction.

13. A balance ring for an appliance as in claim 1, wherein the balance ring comprises:
an upper portion; and
a lower portion;
wherein said upper portion and said lower portion are joined in complementary fashion to form the balance ring.

14. A balance ring for an appliance as in claim 13, wherein said upper portion and said lower portion each comprises a plurality of tongues that connect together in complementary fashion to join said upper portion and said lower portion.

15. A balance ring for an appliance as in claim 14, wherein said plurality of openings are created in part by a plurality of grooves formed along a top edge of one of said plurality of tongues of said lower portion.

16. A washing machine appliance, comprising;
a cabinet;
a wash tub received within said cabinet;
a wash basket rotatably received within said wash tub, said wash basket defining an exterior surface extending circumferentially around said wash basket;
a motor connected with said wash basket and configured for rotating said wash basket;
a balance ring connected to said wash basket and having radial and circumferential directions, the balance ring comprising:
an outer chamber extending along the circumferential direction;
an inner chamber, further comprising a plurality of partial inner sections, extending along the circumferential direction and positioned adjacent and radially inward of said outer chamber;
an innermost chamber extending along the circumferential direction and positioned adjacent and radially inward of said inner chamber;
a dividing wall positioned between said outer chamber and said inner chamber;
a plurality of openings defined by said dividing wall and spaced apart along the circumferential direction, said openings providing for fluid communication between said outer chamber and said inner chamber; and
a fluid located in said outer chamber and said inner chamber, and
wherein said balance ring is configured to pass said fluid circumferentially between said plurality of partial inner sections only through said outer chamber via said openings at spin cycle rotational speeds.

17. A washing machine appliance as in claim 16, wherein said balance ring is positioned on the exterior surface of said wash basket.

18. A washing machine appliance as in claim 16, further comprising a plurality of baffles positioned in said inner chamber and spaced apart along the circumferential direction, said baffles configured for impeding the flow of said fluid along the circumferential direction.

* * * * *